US005404539A

United States Patent [19]

Onozaki

[11] Patent Number: 5,404,539
[45] Date of Patent: Apr. 4, 1995

[54] DATA DRIVEN INFORMATION PROCESSOR WITH RING COMPARING COMPARATOR

[75] Inventor: Manabu Onozaki, Nara, Japan

[73] Assignee: Sharp Kabushiki Kaisha, Osaka, Japan

[21] Appl. No.: 999,360

[22] Filed: Dec. 31, 1992

[30] Foreign Application Priority Data

Jan. 8, 1992 [JP] Japan .................. 4-001595

[51] Int. Cl.6 .................. G06F 15/82; G06F 7/04
[52] U.S. Cl. .................. 395/725; 395/800;
370/60; 370/94.1; 364/232.22; 364/281.3;
364/284.2; 364/260; 364/259; 364/259.2;
364/DIG. 1
[58] Field of Search .................. 395/800, 375, 275, 400,
395/425, 725, 775; 370/60, 94.1, 85.6;
340/825.51

[56] References Cited

U.S. PATENT DOCUMENTS

| 4,130,885 | 12/1978 | Dennis | 395/425 |
| 4,965,715 | 10/1990 | Yoshida | 395/375 |
| 5,072,377 | 12/1991 | Asai et al. | 395/400 |
| 5,093,919 | 3/1992 | Yoshida et al. | 395/800 |
| 5,113,339 | 5/1992 | Komatsu et al. | 395/200 |
| 5,117,489 | 5/1992 | Komori et al. | 395/375 |
| 5,117,499 | 5/1992 | Miyata | 395/800 |
| 5,241,683 | 8/1993 | Okamoto | 395/800 |
| 5,257,392 | 10/1993 | Okamoto | 395/800 |

FOREIGN PATENT DOCUMENTS 3-83185 4/1991 Japan .................. G06F 15/82

Primary Examiner—Gopal C. Ray

[57] ABSTRACT

Data packet groups to be input to a data driven type information processor are sequentially allotted generation number data successive in a ring-like manner and the order of input. When two different data packets contend for access at the time of detection of paired data in the information processor, the two generation number data contending for access are compared with each other in terms of the above-described ring-like relationship to determine priority for paired data detection processing based on the comparison result, thereby ensuring that a data packet group input first to the information processor is always given priority for processing.

26 Claims, 9 Drawing Sheets

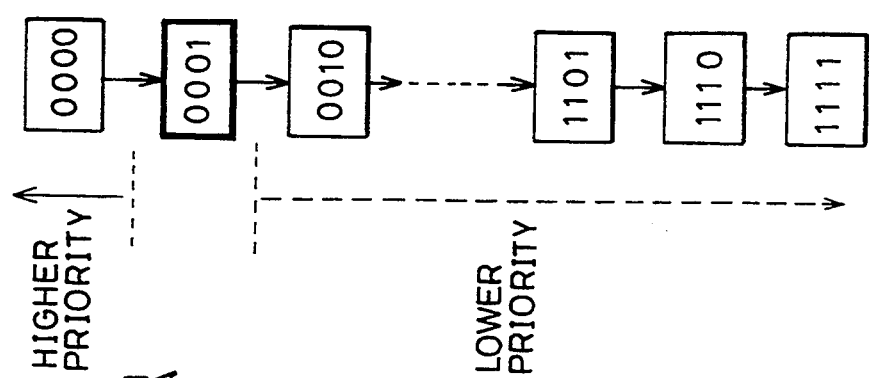
FIG.1B CONVENTIONAL EXAMPLE
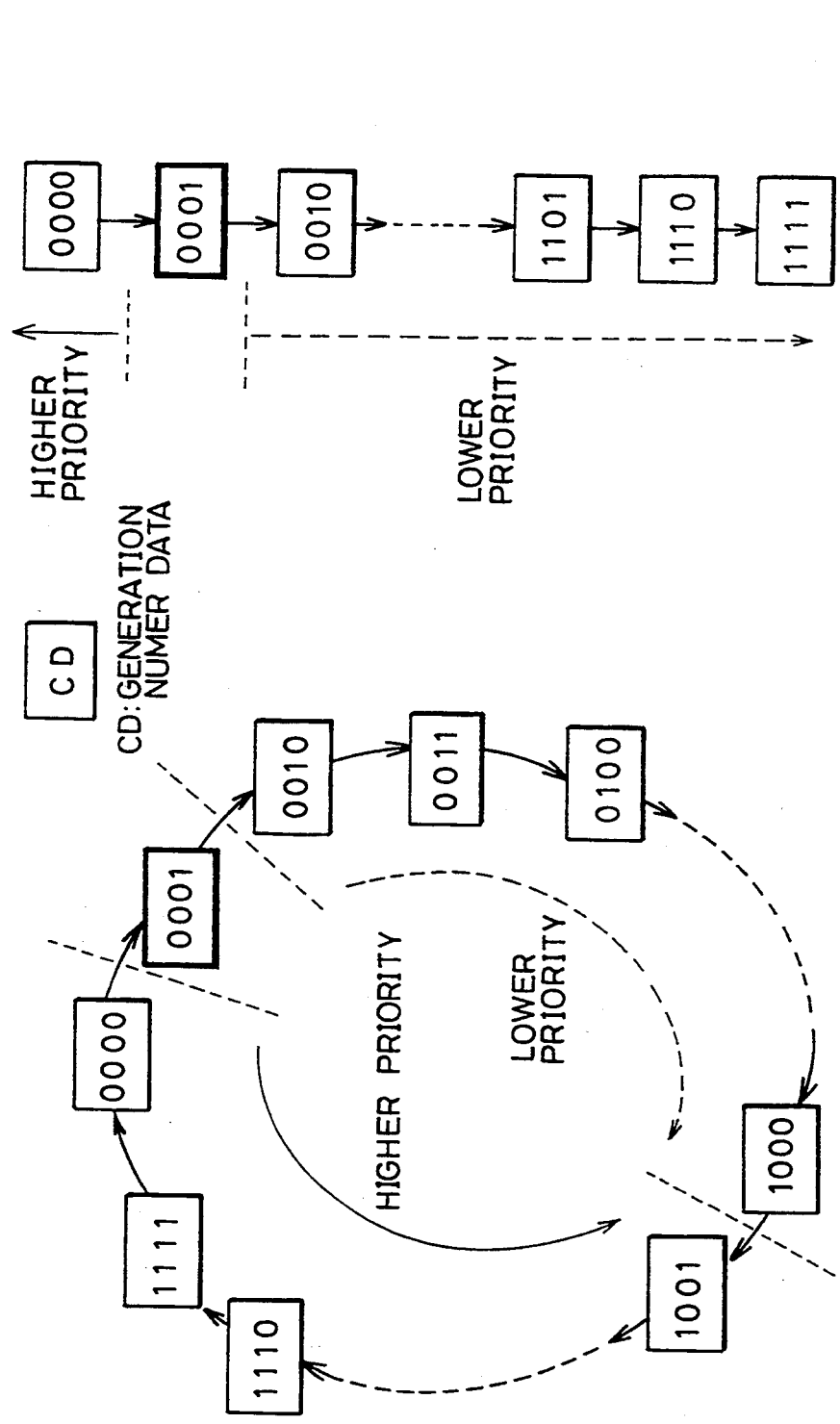
FIG.1A PRESENT EMBODIMENT

FIG.7

| 2-OPERAND FLAG 106 | VALID FLAG 105 | ZERO SIGNAL 104 | MSB SIGNAL 103 | OPERATION OF SWITCH 200 | OPERATION OF SWITCH 300 | COMENT | |
|---|---|---|---|---|---|---|---|
| ① | 0 | — | — | — | N-EX | EX | 1-OPERAND INSTRUCTION |
| ② | 1 | 0 | — | — | EX | EX | QUEUING REGION EMPTY |
| ③ | 1 | 1 | 1 | — | N-EX | N-EX | FIRING |
| ④ | 1 | 1 | 0 | 0 | N-EX | EX | GIVE PRIORITY TO 102 (MEMORY)SIDE } UNFIRING |
| ⑤ | 1 | 1 | 0 | 1 | EX | EX | GIVE PRIORITY TO 101 (INPUT)SIDE |

EX : DATA EXCHANGE
N-EX : DATA NON-EXCHANGE

DATA DRIVEN INFORMATION PROCESSOR WITH RING COMPARING COMPARATOR

BACKGROUND OF THE INVENTION

1. Field of the Invention

The present invention relates generally to data driven type information processors, and more particularly, to data driven type information processors capable of processing a plurality of different data packet groups in parallel in accordance with the same data flow program.

2. Description of the Background Art

In a conventional von Neuman computer, various types of information are stored as a program in a program memory in advance, and addresses in the program memory are sequentially specified by a program counter so that the instructions are sequentially read out, the instructions are executed.

On the other hand, a data driven type information processor is one type of non-von-Neuman computers do not perform with sequential execution of instructions by a program counter. Such data driven type information processor employs architecture based on parallel processing of instructions. In the data driven type information processor wherein an execution of an instruction is enabled upon collection of data to be operated, a plurality of instructions are simultaneously driven by data, so that programs are executed in parallel in accordance with a natural flow of the data. As a result, it is considered that the time required for the operation will be drastically reduced.

FIG. 10 is a block diagram showing the structure of one example of a conventional data driven type information processor. FIG. 11 is a diagram showing a field structure of a data packet to be applied to a conventional data driven type information processor and that of one embodiment of the present invention. FIG. 10 is a diagram showing the structure of a memory in a paired data detecting unit to be applied to the conventional data driven type information processor and that of one embodiment of the present invention.

In FIG. 11, a data packet PD includes a flag field F1, a destination field F2, a generation number field F3, an instruction field F4, a data 1 field F5 and a data 2 field F6. The field F1 stores a 2-operand flag 106 and a flag 107 indicative of unfiring (hereinafter referred to as an unfiring flag), the field F2 stores node number data "node", the field F3 stores generation number data "CD", the field F4 stores an operation instruction OP, and the field F5 or F6 stores operand data D1 or D2. More detailed description will be made of each data and flag stored in a data packet PD later.

The data driven type information processor shown in FIG. 10 includes a junction unit 10 for outputting applied data packets in the order of application, a program storing unit 11 for storing a data flow program in advance, a paired data detecting unit 12a including a memory 600, an operation processing unit 14, a branch unit 15 and a data buffer 16. Junction unit 10 inputs applied data packets and outputs the same to program storing unit 11 in due order. Program storing unit 11 stores in advance a data flow program including a plurality of records which store destination information (node number data and generation number data) and instruction information (operation instructions). Program storing unit 11 reads out destination information and instruction information in a subsequent order from the data flow program by addressing based on node number data "node" in the applied data packet PD, stores the destination information and the instruction information in the fields F2 and F4 of the applied data packet, respectively, and outputs the input data packet PD.

Memory 600 of paired data detecting unit 12a will be described in the following. The structure of memory 600 is shown in FIG. 12. Memory 600 has a physical space accessible by addressing based on node number data "node" of a data packet PD input to detecting unit 12a. Each addressing domain stores a valid flag 105 and matching data or empty data (data indicative of nothing). Matching data includes matching generation number data CD1, a matching operation instruction OP1 and matching operand data D3. The flag 105 is set only when matching data to be read is stored in a corresponding domain and otherwise it is reset.

Operation of paired data detecting unit 12a will be described assuming that only matching operand data D3 is stored as matching data in memory 600. Paired data detecting unit 12a matches two operand data to be processed for execution of a 2-input instruction (two item operation etc.) in an operation processing unit 14 in a succeeding stage when a flag 106 of an input data packet PD is set. In other words, the paired data detecting unit 12a detects two different data packets PD having the same destination information. When a data packet PD with a flag 106 set is input, paired data detecting unit 12a reads a valid flag 105 stored in an addressing domain of memory 600 by addressing based on the node number data "node" of the input packet PD. At this time, if the read flag 105 is set, which means that data to be paired are already in a matching state in memory 600, the input data packet PD stores operand data D3 in its field F5 or F6, that is, the packet PD stores two different operand data pairs, which input data packet is output to operation processing unit 14. Then, a valid flag 105 corresponding to the matching operand data D3 as data to be paired is reset. Conversely, if the flag 105 stored in the addressing domain is reset, which means that operand data to be paired has not been input, the data of the input data packet PD is written in the addressing domain to set the corresponding flag 105 in the addressing domain, whereby the input data packet PD stands by in memory 600 for input of a data packet PD to be paired.

Operation processing unit 14 inputs a data packet PD applied from paired data detecting unit 12a, performs operation processing for data D1 or D2 stored in the input packet PD based on the operation instruction OP stored in the input data packet PD, stores data indicative of the operation result in the field F5 of the input data packet PD and outputs the input data packet PD to branch unit 15. Branch unit 15 selectively outputs the input data packet PD outside the information processor or to data buffer 16 based on destination information of the input data packet PD from operation processing unit 14. Data buffer 16 inputs applied data packets PD and sequentially outputs the same.

As the data packet PD continues to circulate through program storing unit 11, paired data detecting unit 12a, operation processing unit 14, program storing unit 11, . . . as described in the foregoing, the operation proceeds based on the data flow program stored in program storing unit 11.

A data driven type information processor having a mechanism of processing a plurality of different data packet groups in parallel by using the same data program will be specifically referred to as a dynamic data driven type information processor. A processing operation of the dynamic data driven type information processor will be briefly described in the following. FIGS. 13A and 13B are diagrams for illustrating a processing operation of the dynamic data driven type information processor. As shown in FIG. 13A, for example, consideration will be given to a data flow program which inputs three data of data X1, X2 and X3 to obtain outputs Y1, Y2. It is assumed that in an execution of the program by the dynamic data driven type information processor by using the plurality of data groups including data X1, X2 and X3, another new data group (X1, X2, X3) is input to the information processor after confirming outputs (Y1, Y2) so as to prevent different data groups from being mixed to each other to cause malfunction at the time of data input or during processing. However, with an identifier for distinguishing a data group being input or processed from other data groups being processed, another data group could be input without waiting for the processing of a certain data group to finish. Hereinafter, such identifiers will be referred to as generation numbers and allotted in an ascending order to corresponding data groups to be applied to the information processor in the order of application. Such dynamic data driven type information processor as shown in FIG. 13B can be equipped with a processing mechanism of inputting a plurality of data groups to which different generation numbers are allotted and individually identifying these data groups by the generation numbers to output a correct result while preventing the different data groups from mixing. The following is an example of a data group to which generation numbers are allotted. In a case where data groups, which are obtained by sampling at fixed intervals a plurality of signals which are changed with the lapse of time, are sequentially input to a dynamic data driven type information processor, for example, there exist a plurality of different data packets according to a lapse of "time". In this case, the generation numbers are stored in the field F3 of a data packet PD as generation number data CD.

Description will be made of processing by using generation number data CD at paired data detecting unit 12a. During data processing, an operation is performed between a data packet PD wherein generation number data CD is stored and a data packet PD having the same generation number data CD in order to generate resultant data having the same generation number data CD. Paired data detecting unit 12a therefore should detect data of data packets PD to be paired which have the same generation number data CD and the same node number data "node". Memory 600 desirably has a matching region, that is, a physical memory space, for detecting paired data out of all of combinations of all generation number data CD and node number data "node" to be used. However, with an increase in the number of generations and nodes to be treated, a physical memory space required in memory 600 is expanded, which is neither practical nor economical for an effective use of the memory. Thus, paired data detecting unit 12a processes data packet groups having different generation number data CD such that they share the same queuing region, that is, the same address space in memory 600. In other words, the paired data detecting unit processes data packet groups having different generation number data CD by addressing memory 600 based on an address value (hereinafter referred to as "hash address") obtained as a result of a hash operation of node number data "node" such that even such data packet groups having different generation number data share the same matching region in memory 600. Operation of paired data detecting unit 12a related to the share of the queuing region will be described.

Paired data detecting unit 12a, upon input of an applied data packet PD, reads data from memory 600 by addressing based on a hash address of the input packet PD. In particular, comparison of the generation number data is made, to carry out paired data detection based on the comparison result. More specifically, if the flag 105 read by addressing is at a reset state, data of the input data packet PD is written in the addressing domain as queuing data. However, if the read flag 105 is being set, comparison is made between generation number data CD in the input data packet PD and queuing generation number data CD1 stored in the addressing domain. At this time, if the generation number data are equal to each other, data packets to be paired are detected to reset a flag 105 in the addressing domain. Conversely, if the generation number data are not equal to each other, the priority for the use of the addressing domains (matching regions) is determined based on the comparison result. In more detail, if the input data packet PD has lower priority (generation number data CD is larger than matching generation number data CD1, for example), the input data packet PD is output through detecting unit 12 without being operated. Conversely, when the input data packet PD has higher priority (for example, the generation number data CD is smaller than the matching generation number data CD1), the data of the input data packet PD and the matching data stored in the addressing domain region are exchanged to each other, so that the input data packet is output from paired data detecting unit 12a. At this time, the unfiring flag 107 of the output data packet PD is set. The data packet PD with the unfiring flag 107 set is not processed (passing through) at operation processing unit 14 and program storing unit 11 after being output from paired data detecting unit 12a but continues to circulate inside the information processor until the corresponding match region of memory 600 in paired data detecting unit 12a is vacated or until a data packet to be paired is detected. As described in the foregoing, the dynamic data driven type information processor proceeds with a processing while determining priority for the use of match regions for detecting data packets to be paired based on generation number data CD. A maximum generation number is determined depending on a format of a data packet PD, that is, a bit length of the field F3 for storing generation number data CD. The bit length is in turn determined by a physical size of the information processor, a width of a data line for connecting respective portions and a processing (transmission) rate. When the total number (the number of generations) of data packet groups to be supplied to the dynamic data driven type information processor is smaller than the maximum generation number determined as described above, data packets PD are applied in a conventional manner and generation number data are compared by paired data detecting unit 12a, so that a data packet group, which has been applied prior to the other groups, that is, which has higher processing priority, can reliably receive priority for data processing. On the other hand, when data packet groups larger in number than the generations that a data packet PD can handle are sequentially and continuously applied to and processed by the information processor in accordance with the processing priority although there simultaneously exist a less number of generations in the dynamic data driven type information processor, it is necessary to re-allot once used generation number data CD to other later applied data packet groups. However, if the generation number data CD is re-allotted to a data packet group which is applied later, generation number data CD of the previously applied data packet group might be larger (with lower priority) than the generation number data CD of the later applied data packet group, so that a conventional mere comparison of generation number data will not ensure a data packet group (a data packet group applied previously) to be data-processed prior to the others (given priority for using a queuing region). For the foregoing reasons, in a case where processing resultant data having a certain generation number n is used as a part of input data having a re-allotted generation number n-1 applied later, data to be fired (to be paired), that is, data with the generation number n has lower priority than that with the generation number n-1 in the dynamic data driven type information processor, whereby a matching region of memory 600 can not be used, thereby delaying a processing for the data, so that a matching region required for the processing is kept occupied (hereinafter referred to as "deadlock").

SUMMARY OF THE INVENTION

An object of the present invention is to reliably give data packet groups processing priority in the order of application of the groups in a data driven type information processor wherein data packet groups allotted generation numbers with higher processing priority receive priority for processing, even if generation numbers allotted in the order of application of the data packet groups to the information processor run out of fixed values.

Another object of the present invention is to normally continue processing without delay in a data driven type information processor wherein data packet groups allotted generation numbers with higher processing priority receive priority for processing, even if generation numbers allotted in the order of application of the data packet groups to the information processor run out of fixed values.

In order to achieve the above-described objects, the data driven type information processor according to the present invention, which is a device for processing a plurality of data packet groups with generation numbers for identification allotted in advance in parallel and in accordance with a data flow program, includes a program storing means, a matching memory, a paired data generating means and an operation processing means.

The program storing means stores a data flow program including a plurality of destination information and a plurality of instruction information, inputs a data packet composed of a generation number field for storing a generation number, a destination field for storing destination information, an instruction field for storing instruction information, and first and second data fields for storing data, reads destination information and instruction information from the data flow program by addressing based on the contents of the destination field of the input data packet, stores the respective read information in the destination field and the instruction field of the input data packet, respectively, and outputs said input data packet.

The matching memory has an address space with physical addresses corresponding to values obtained from a predetermined operation on the contents of a data packet and stores the contents of the data packet according to each physical addresses.

The paired data generating means inputs a data packet output from the program storing means, compares the contents of the input data packet with the contents of a data packet in the matching memory specified by the above-described physical address obtained from the contents of the input data packet, generates a data pair based on the comparison result, stores the generated paired data in the first and the second data field of the input data packet, and outputs the input data packet, or writes the contents of the input data packet in the matching memory specified by the physical address, or outputs the input data packet without being operated, or exchanges the contents of the input data packet with the contents of the data packet in the matching memory specified by the physical address, to output the input data packet.

The operation processing means inputs a data packet output from the paired data generating means, decodes instruction information in an instruction field of the input data packet, performs an operation processing on the data in the first or the second data field of the input data packet based on the decoding result, stores the operation result in the first or the second data field of the input data packet and outputs said input data packet to the program storing means.

In thus structured data driven type information processor, the above-described generation numbers are sequentially and circularly given processing priority for the above-described paired data generation to establish a ring-like relation, and the above-described generation numbers are sequentially allotted to the plurality of data packet groups in advance according to the order of application of the groups to the information processor. As a result of the above comparison by paired data generating means, when an input data packet and a data packet stored in an addressed matching memory which have the same physical address contend for access for the matching memory, the data driven type information processor compares generation numbers of both of the data packets contending for the access with each other based on the above-described ring-like relationship to ensure that processing priority for generating paired data out of both data packets coincides with an order of an application of the packets to the information processor based on the comparison result.

In the data driven information processor according to the present invention, if a plurality of different data packet groups are to be processed in parallel according to a data flow program, the data pair generating means always ensures that processing priority of each data packet group coincides with the order of application of the packets to the information processor. Therefore, deadlock caused by contention for access in the matching memory can be avoided to always enable a processing of a plurality of data packet groups according to correct processing priority without delaying the processing.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 1B are diagrams showing, as a comparison, a method of comparing generation numbers according to one embodiment of the present invention and a conventional method of comparing generation numbers.

FIG. 7 is a table illustrating operation of a switch control portion of the paired data detecting unit shown in FIG. 5.

DESCRIPTION OF THE PREFERRED EMBODIMENTS

Figure 2:
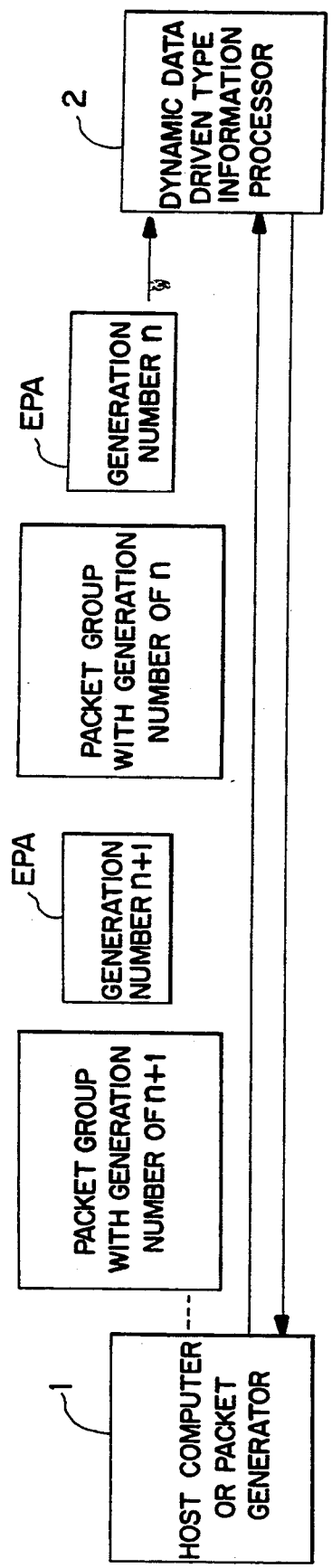
FIG. 2 is a schematic diagram showing the structure of a system including a dynamic data driven type information processor according to one embodiment of the present invention.
Figure 3:
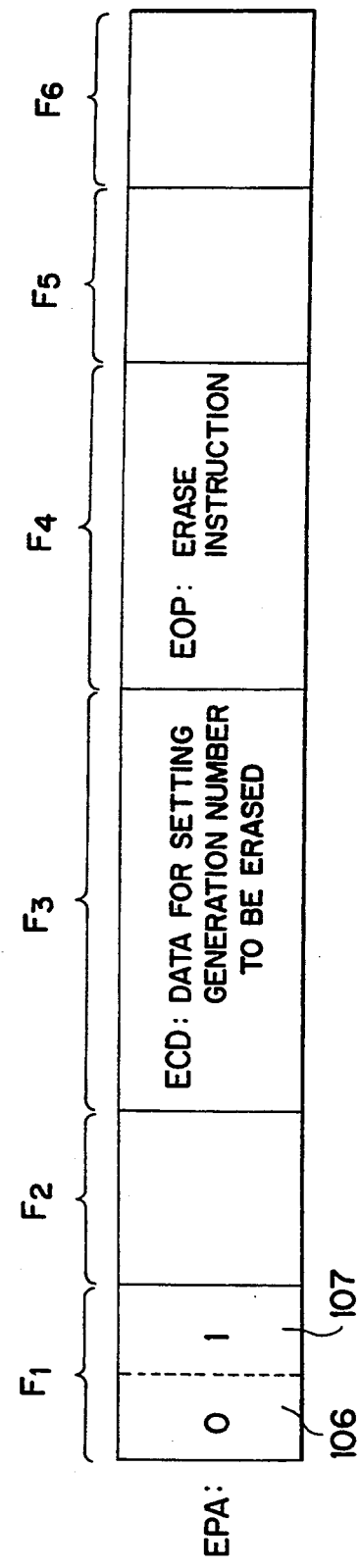
FIG. 3 is a diagram showing a field structure of an erasing packet for erasing a predetermined data packet group being processed in a dynamic data driven type information processor according to one embodiment of the present invention.
Figure 4:
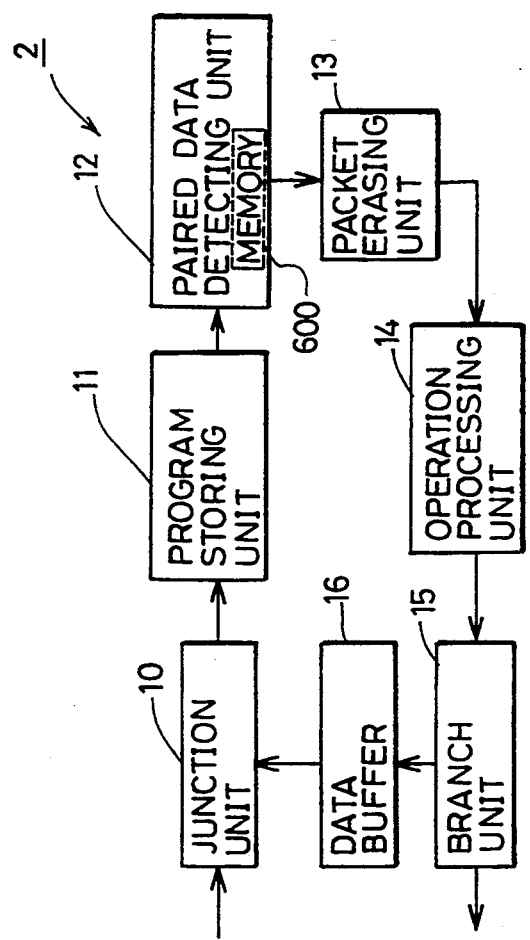
FIG. 4 is a block diagram showing the structure of a dynamic data driven type information processor according to one embodiment of the present invention.
Figure 5:
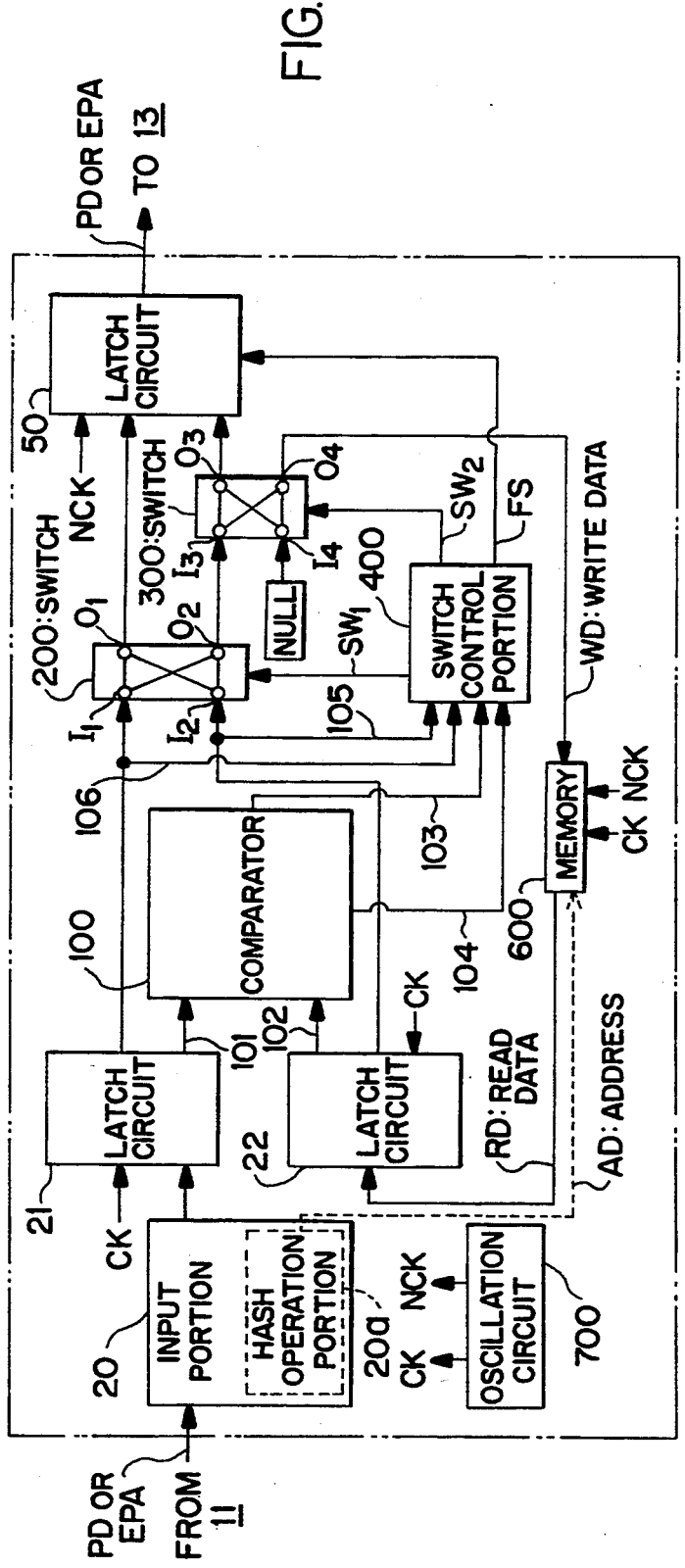
FIG. 5 is a block diagram showing the structure of a paired data detecting unit according to one embodiment of the present invention.
Figure 6:
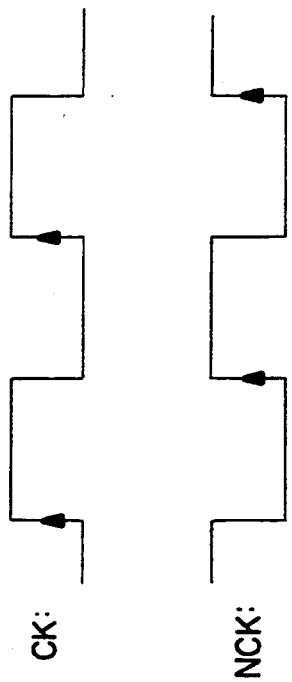
FIG. 6 is a diagram showing a clock signal to be supplied to the paired data detecting unit shown in FIG. 5.
Figure 8:
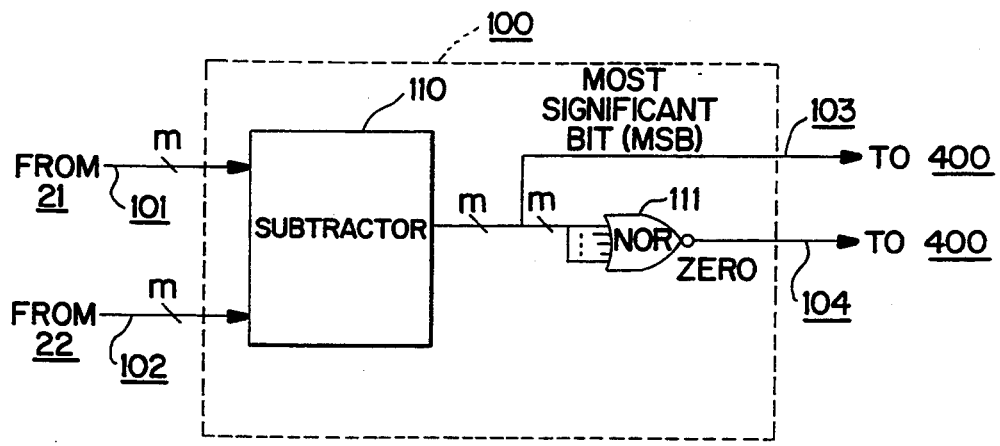
FIG. 8 is a block diagram showing the structure of a comparator in the paired data detecting unit shown in FIG. 5.
Figure 9:
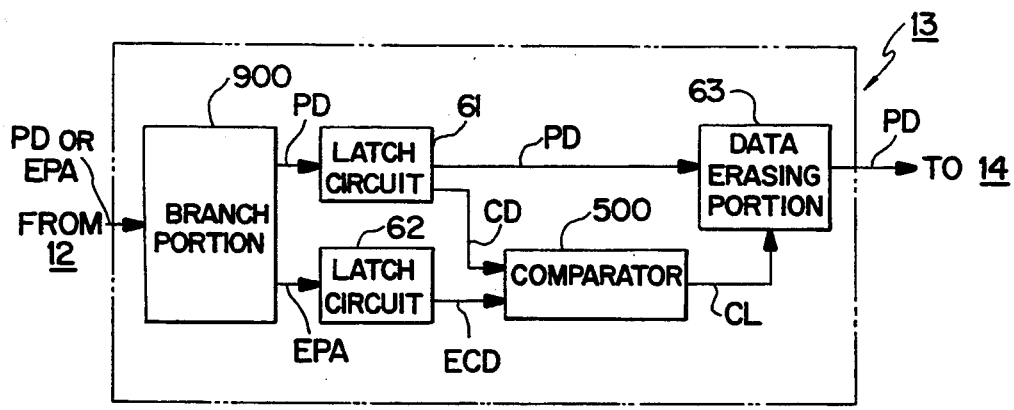
FIG. 9 is a block diagram showing the structure of a packet erasing unit according to one embodiment of the present invention.
Figure 10:
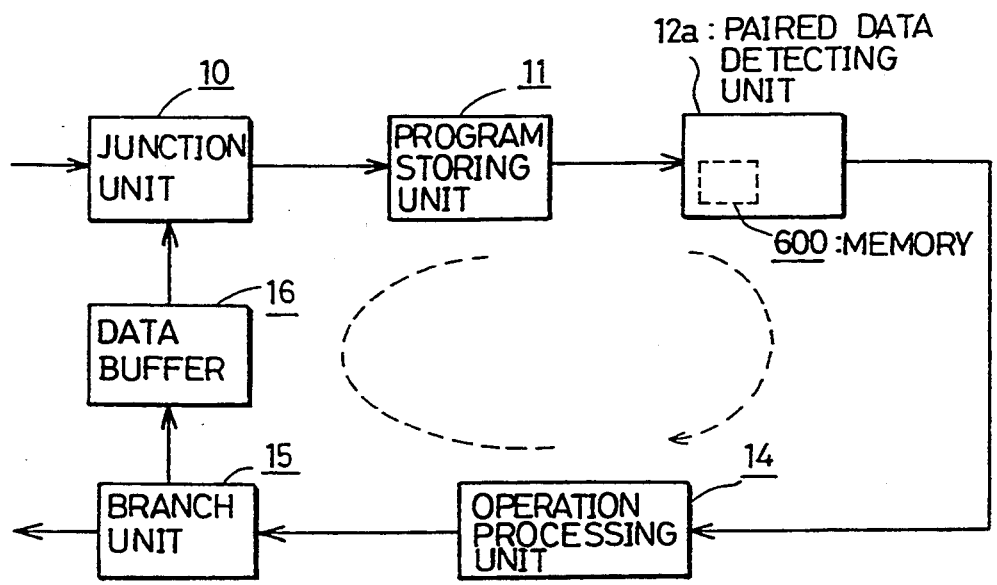
FIG. 10 is a block diagram showing the structure of one example of a conventional data driven type information processor.

One embodiment of the present invention will be described in detail in the following with reference to the drawings. FIGS. 1A and 1B show a method of comparing generation numbers according to one embodiment of the present invention and a conventional method of comparing generation numbers, respectively. FIG. 2 shows a schematic structure of a system including a dynamic data driven type information processor according to one embodiment of the present invention. FIG. 3 shows a field structure of an erasing packet EPA for erasing a predetermined data packet group being processed in a data driven type information processor according to one embodiment of the present invention. FIG. 4 shows the structure in block of the data driven type information processor according to one embodiment of the present invention. FIGS. 5 and 6 show the structure in block of a paired data detecting unit according to one embodiment of the present invention and a clock signal to be supplied to the detecting unit, respectively. FIG. 7 shows, in table, an operation of a switch control portion in the paired data detecting unit shown in FIG. 5. FIG. 8 shows the structure in block of a comparator in the paired data detecting unit shown in FIG. 5, while FIG. 9 shows the structure of a packet erasing unit shown in FIG. 4 in block.

Figure 11:
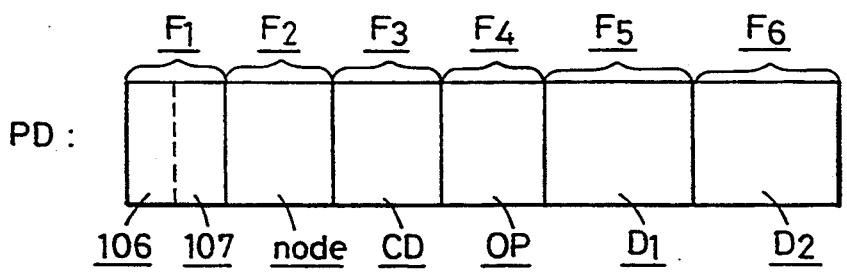
FIG. 11 is a diagram showing the field structure of a data packet to be applied to a conventional dynamic data driven type information processor and to one embodiment of the present invention.

With reference to FIG. 2, a dynamic data driven type information processor 2 is connected to a host computer or a packet generator 1 through communication. The host computer or packet generator 1 generates a plurality of different data packet groups each including a plurality of data packets PD wherein the same generation number data CD are stored and transmits the groups to an information processor 2. In addition, the host computer or packet generator 1 generates and outputs an erasing packet EPA in order to erase a packet group data processing of which is not necessary in information processor 2. With reference to FIG. 3, the erasing packet EPA has the same field structure as that of the data packet PD shown in FIG. 11. A control field F1 stores a reset 2-operand flag 106 and a set unfiring flag 107, a field F3 stores data ECD for setting a generation number to be erased and a field F4 stores an erase instruction EOP for giving instructions on the erase of a data packet. In FIG. 2, a data packet to be supplied to the dynamic data driven type information processor 2 is generated by a host computer or packet generator 1. In order to vanish a data packet group in information processor 2 to which, for example, a generation number n to be re-used is allotted in advance prior to the data packet group with the generation number n is supplied to information processor 2, the host computer or packet generator 1 generates an erasing packet EPA wherein data ECD and an instruction EOP for vanishing the data packet with the generation number n are stored, and supplies the packet EPA to information processor 2. Erase of a data packet group in information processor 2 by using an erasing data packet EPA will be described later.

FIG. 4 shows a block structure of dynamic data driven type information processor 2 which includes a junction unit 10, a program storing unit 11, a paired data detecting unit 12 having a memory 600, a packet erasing unit 13, an operation processing unit 14, a branch unit 15 and a data buffer 16. The respective portions except for paired data detecting unit 12 and packet erasing unit 13 are the same as those of the above-described conventional data driven type information processor, detailed description of which will not be made. In addition, the field structure of a data packet PD according to the present embodiment is also the same as that shown in FIG. 11 and therefore no detailed description will be made.

FIG. 5 shows the block structure of paired data detecting unit 12 shown in FIG. 3. With reference to FIG. 5, paired data detecting unit 12 includes an input portion 20 including a hash operation portion 20a, latch circuits 21, 22, and 50, a comparator 100, switches 200 and 300, a switch control portion 400, a memory 600 for matching data packets PD for detecting paired data and an oscillation circuit 700 for outputting clock signals CK and NCK. The clock signals CK and NCK are supplied to the respective portions of paired data detecting unit 12 and time charts of the signals are shown in FIG. 6. The clock signal CK is supplied to latch circuits 21 and 22 and memory 600, while the clock signal NCK is supplied to latch circuit 50 and memory 600. As shown in FIG. 6, the clock signal NCK is a signal half-cycle shifted from the clock signal CK.

Input portion 20 inputs a data packet PD or EPA output from program storing unit 11 and applies the same to latch circuit 21, while the portion performs a hash operation with respect to an input data packet by using hash operation portion 20a in a conventional manner to obtain a hash address and supplies the hash address to memory 600 as an address AD.

Figure 12:
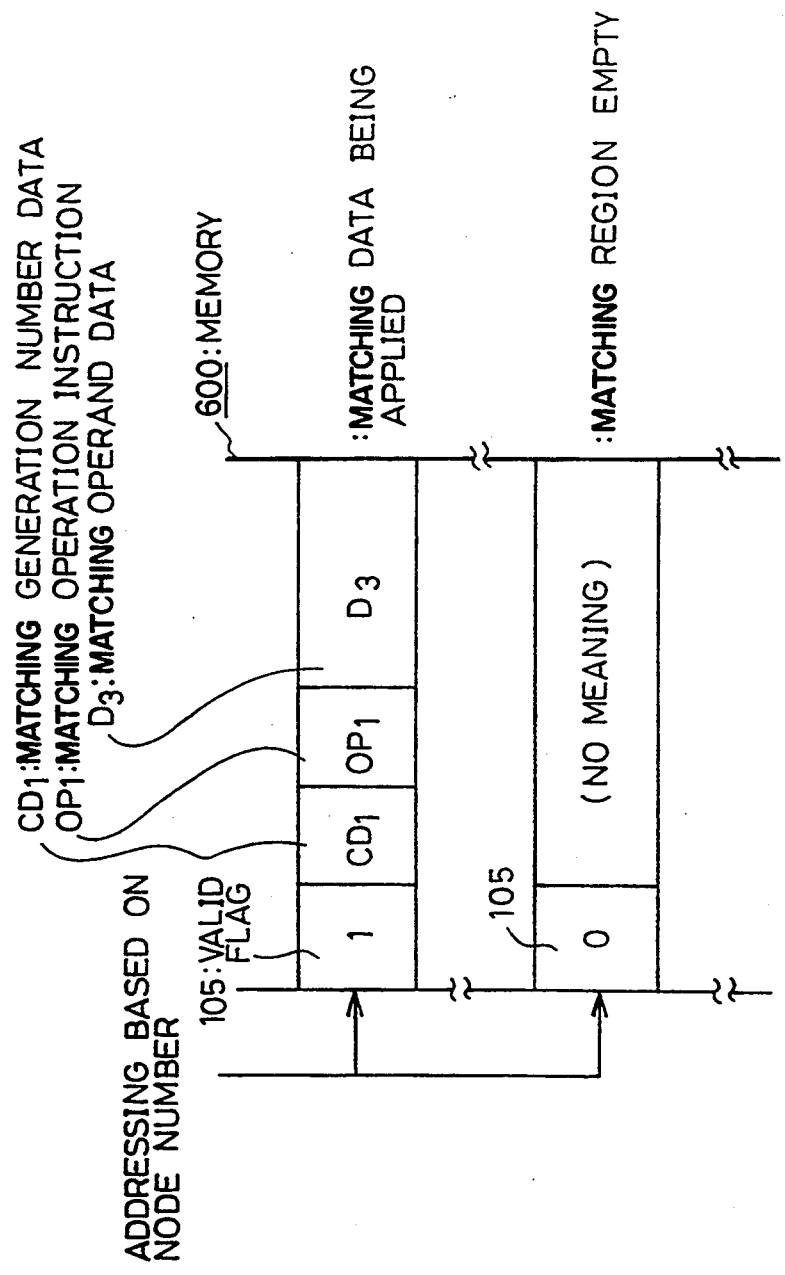
FIG. 12 is a diagram showing the structure of a memory of the paired data detecting unit to be applied to a conventional dynamic data driven type information processor and to one embodiment of the present invention.
Figure 13B:
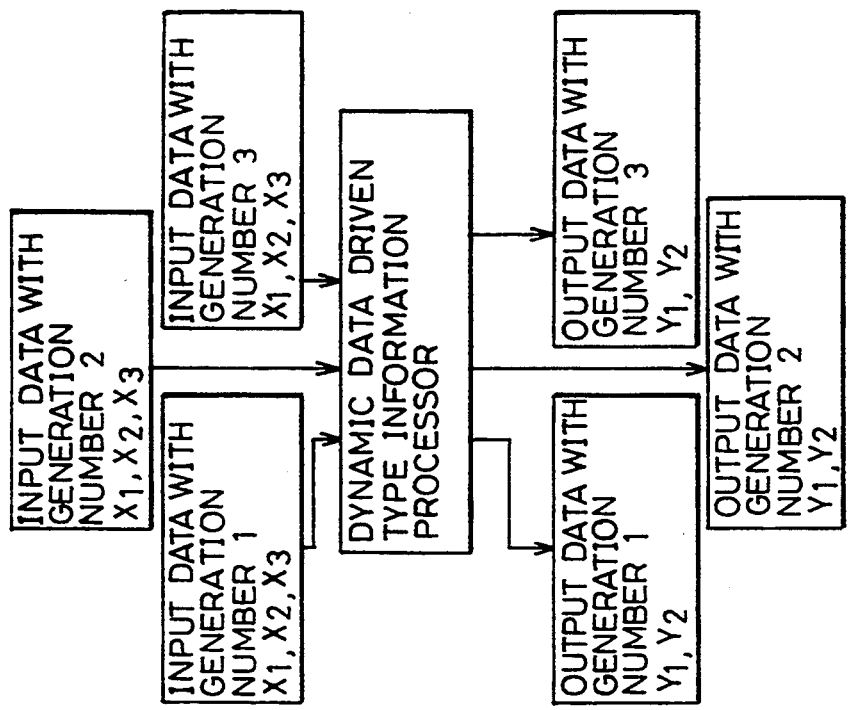
FIGS. 13A and 13B are diagrams illustrating a processing operation of a dynamic data driven type information processor.
Figure 13A:
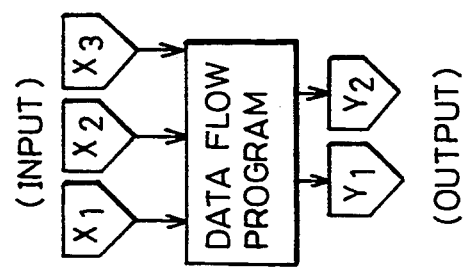

Memory 600, having such a structure as described above and shown in FIG. 12, reads matching data and a valid flag 105 as read data RD in synchronization with the clock signal CK by addressing based on the address AD applied from hash operation portion 20a and thereafter writes write data WD applied through switch 300 by setting or resetting the flag 105 of the addressing domain in synchronization with the clock signal NCK as required. The write data WD will be described in detail later.

Latch circuit 21 inputs and outputs a data packet applied through input portion 20 in synchronization with the clock signal CK. Latch circuit 22 inputs and outputs read data RD applied from memory 600 in synchronization with the clock signal CK. Latch circuit 21 outputs the applied data packet to switch 200, while outputting generation number data CD in the applied data packet as generation number data 101 to comparator 100. Latch circuit 22 applies the applied read data RD to switch 200, while applying matching generation number data CD1 in the read data RD as generation number data 102 to comparator 100. The output data of latch circuits 21 and 22 are maintained until a subsequent clock signal CK is applied.

Comparator 100 inputs and compares the generation number data 101 in the data packet applied to paired data detecting unit 12 and the generation number data 102 in the read data RD matched at memory 600 to determine whether both data are equal (referred to as "firing") or not equal (referred to as "unfiring") to each other, and outputs an MSB signal 103 and a ZERO signal 104 to switch control portion 400 based on the determination result. At the time of firing, only the signal 104 is output as a bit signal of "1" and at the time of unfiring, only the MSB signal 103 is output as a bit signal of "1". The MSB signal 103 is a signal for giving an instruction on which of the read data RD read from memory 600 and data in the data packet input to paired data detecting unit 12 is to be written in an addressing domain, that is, in a matching region, based on the address AD of memory 600.

Switch control portion 400 inputs a 2-operand flag 106 in the data packet PD applied through latch circuit 21, the valid flag 105 in the read data RD output through latch circuit 22, the MSB signal 103 and the ZERO signal 104 and performs a signal processing thereto to output switch switching signals SW1 and SW2 and a control signal FS to switches 200 and 300 and latch circuit 50, respectively. A relationship between input signals and output signals of switch control portion 400 is illustrated in Table of FIG. 7, of which description will be made later.

Switch 200 has input ports I1 and I2 and output ports O1 and O2. In response to the switch switching signal SW1 applied from switch control portion 400, switch 200 non-switchedly or switchedly outputs data of a data packet input to detecting unit 12 from input port I1 through latch circuit 21 and read data RD which is applied to input port I2 through latch circuit 22 and matched at memory 600, from output ports O1 and O2. When both data are output without switching, the data in the input data packet is output through output port O1 and the read data RD is output through output port O2. When the data are switchedly output, the data in the input data packet and the read data RD are output through output port O2 and output port O1, respectively.

Switch 300 has input ports I3 and I4 and output ports O3 and O4. In response to the switch switching signal SW2 applied from switch control portion 400, switch 300 inputs data applied to input port I3 through output port O2 of switch 200 and NULL data (empty data) applied to input port I4 and outputs the same non-switchedly or switchedly through output ports O3 and O4, respectively. When both data are output without being switched, the data applied to input port I3 is output through output port O3, while the NULL data applied to input port I4 is output through output port O4. When the data are switchedly output, the data applied to input port I3 and the NULL data applied to input port I4 are output through output ports O4 and O3, respectively.

Latch circuit 50 outputs data applied from switch 200 or switch 300 in the form of data packets based on the control signal FS to packet erasing unit 13 in synchronization with the signal NCK. More particularly, when the signal FS is at a "0" level, circuit 50 makes data applied through switch 200 and data applied through switch 300 into one data packet PD and outputs the same. When the signal FS is at a "1" level, circuit 50 outputs a data packet PD applied through latch circuit 21 or read data RD applied through latch circuit 22 as a data packet PD. When the signal FS is at a "1" level, circuit 50 sets the unfiring flag 107 in a data packet PD to be output and outputs the data packet PD.

Comparator 100 will be described in the following. As shown in FIG. 8, comparator 100 includes a subtractor 110 and an NOR (inverted OR) gate 111. Subtractor 110 inputs, for example, m-bit generation number data 101 and 102, subtracts the data 101 from the data 102 while considering the data as integers without a sign and outputs the substraction result data as m-bit data. Out of the m-bit subtraction result data, the highest bit is output as an MSB signal 103 to switch control portion 400. It is assumed that the MSB signal 103 at a "1" level indicates that the generation number data 101 has higher processing priority than the generation number data 102, and conversely the MSB signal 103 at a "0" level indicates that the generation number data 102 has higher processing priority than the operation number data 101.

In addition, each bit of the m-bit substraction result data is applied to NOR gate 111 wherein the bit is subjected to an NOR operation. NOR gate 111 brings a ZERO signal 104 to a "1" level and outputs the same to switch control portion 400 only when all of input m bits are at a "0" level. In other words, when the signal 104 is output at a "1" level, the determination is made that the generation number data 101 and 102 are equal irrespective of the level of the MSB signal 103. Comparison between generation numbers by comparator 100 will be further described with reference to FIGS. 1A and 1B.

FIG. 1A shows a method of comparing generation numbers by using comparator 100 according to the present embodiment, while FIG. 1B shows a conventional method of simple comparison between generation numbers. As shown in FIGS. 1A and 1B, generation number data CD are represented as four-digit binary numbers. The data packet groups are allotted the generation number data CD 0 (0000)→ 1 (0001)→ 2 (0010)→, 14 (1110)→ 15 (1111)→ 0→ 1→ 2→ . . . in the order that the groups are to be processed (in the order of input to information processor 2) and are input sequentially. Since the generation number data CD are represented as four-digit binary numbers, the values range from 0 to 15. It is assumed as follows. The generation number data CD are sequentially allotted to the data packet groups which are sequentially input to information processor 2. When the generation number data CD which exceeds the last generation number data CD of 15 is to be allotted, the numbering of the data returns to the start, that is, the data is considered to be the generation number data CD of 0, and hereafter the generation number data CD are sequentially allotted. In FIG. 1A, the generation number data CD have a ring-like relationship. Noting the data packet group (surrounded by a thick line in the figure) with generation number data CD of (0001), distinctly shown in FIG. 1A are generation number data distinguished as having higher priority than the generation number data CD by using comparator 100 and generation number data distinguished as having lower priority by using comparator 100. As can be seen from the figure, the generation number data having higher priority than the noted generation number data CD (0001) are eight data of (0000), (1111), (1110), . . . , (1001), and on the other hand, generation number data having lower priority are seven data of (0010), (0011), (0100), . . . , (1000). FIG. 1B shows a conventional example. Noting the generation number data CD (0001) (surrounded by a thick line) similarly to FIG. 1A, distinctly shown in FIG. 1B are generation number data distinguished as having higher priority than the generation number data CD and generation number data distinguished as having lower priority. As can be seen from the figure, generation number data having higher priority than the generation number data CD (0001) is only (0000).

As described in the foregoing, comparator 100 of the present embodiment ensures that generation number data having higher priority than any of noted generation number data CD are eight generation number data input to information processor 2 prior to the noted generation number data CD, and conversely, generation number data having lower priority are seven generation number data input to information processor 2 later than the noted generation number data. In other words, it is made sure that priority for the processing of respective data packet groups to generate data pairs in the data driven type information processor coincides with the order of an application of the respective data packet groups to information processor 2. The present embodiment therefore enables a repeated use of generation number data CD arranged circularly and serially as shown in FIG. 1A.

Back to FIG. 4, packet erasing unit 13 is structured as shown in FIG. 9 so as to erase a data packet group whose processing should not be continued in information processor 2. With reference to FIG. 9, packet erasing unit 13 includes a branch portion 900 having its input stage connected to the output stage of paired data detecting unit 12, latch circuits 61 and 62, a comparator 500 and a data erasing portion 63.

Branch portion 900 inputs a data packet PD or EPA applied from paired data detecting unit 12, responsively decodes an operation instruction stored in the instruction field F4 of the input data packet and selectively outputs the input data packet to either latch circuit 61 or 62 based on a decoding value. When branch portion 900 determines that the operation instruction decoded based on the above-described decoding value is an erase instruction EOP and the input data packet is an erasing packet EPA, the portion 900 responsively applies the input data packet EPA to latch circuit 62. Conversely, when the portion 900 determines that the operation instruction decoded based on the above-described decoding value is an instruction other than the erase instruction EOP and the input data packet is a data packet PD, the portion responsively applies the input data packet PD to latch circuit 61. Latch circuit 62 inputs the applied data packet EPA and applies data ECD for setting a generation number to be erased in the input data packet EPA to comparator 500. The output value of latch circuit 62 is maintained until another data packet EPA is input to circuit 62. Circuit 61 inputs the applied data packet PD and applies generation number data CD stored in the input data packet PD to comparator 500, while applying the input data packet PD to data erasing portion 63. Comparator 500 compares generation number data having the ring-like relationship as shown in FIG. 1A in the same manner as of the above-described comparator 100. Comparator 500 inputs and compares two applied generation number data CD and ECD, and renders a clear signal CL active and applies the signal to data erasing portion 63 only when the data ECD has higher priority than that of the data CD based on the comparison result. In response to an application of the active clear signal CL, data erasing portion 63 inputs and erases (not output) the data packet PD applied from latch circuit 61. Conversely, the data erasing portion inputs the data packet PD applied from latch circuit 61 and outputs the same to operation processing unit 14 in response to an application of a negative clear signal CL.

As described above, in packet erasing unit 13, out of the data packets PD input to information processor 2, a data packet PD allotted generation number data CD having lower priority is erased than that of the data ECD designated by the data packet EPA which has been input immediately before. When data ECD, for example, in the form of (0001), is applied to comparator 500, all of generation number data CD allotted (0010)–(1000) are erased by packet erasing unit 13, among the data packet groups processed in information processor 2 with reference to FIG. 1A.

Operations of dynamic data driven type information processor 2 including a detection operation of paired data detecting unit 12 will be described according to a state of control of switch control portion 400 shown in FIG. 7. As shown in FIG. 7, switch control portion 400 assumes control states [1]–[5] according to respective levels of input signals. As shown in FIG. 7, EX (EXchange of data) in the operation of switch 200 indicates that data applied to input port I1 and data applied to input port I2 are to be output through output ports O2 and O1, respectively, in FIG. 5, while N-EX (No EXchange of data) indicates that data applied to input port I1 and data applied to input port I2 are to be output through output ports O1 and O2, respectively. Similarly, EX (EXchange of data) in the operation of switch 300 indicates that data applied to input port I3 and data applied to input port I4 are to be output through output ports O3 and O4, respectively, and N-EX (No EXchange of data) indicates that the data applied to input port I3 and the data applied to input port I4 are to be output through output ports O4 and O3, respectively.

Control State [1]

When a data packet input to paired data detecting unit 12 stores a 1-operand instruction, no detection is required for of input data packet to be paired, so that switch control portion 400 outputs a switch switching signal SW1 with an N-EX level set and a switch switching signal SW2 with an EX level set in response to a 2-operand flag 106 in the input data packet being reset such that the input data packet is output without being operated from detecting unit 12. In response to the applied signal SW1, switch 200 performs an operation for data non-exchange, while switch 300 performs an operation for data exchange in response to the applied signal SW2. As a result, NULL data is stored in the data 2 field F6 of the input data packet at latch circuit 50 and, the input data packet is output from paired data detecting unit 12 to packet erasing unit 13. Packet erasing unit 13 executes the above-described packet erasing operation when the data packet output from paired data detecting unit 12 is an erasing packet EPA, while the erasing unit passes the data packet PD through when the applied data packet is not a packet EPA.

Control State [2]

When the 2-operand flag 106 in a data packet input to paired data detecting unit 12 is set and an addressing domain of memory 600 specified by an address AD is empty, switch control portion 400 sets signals SW1 and SW2 to an EX level and outputs the signals in response to the valid flag 105 in the data RD read by this addressing being reset. Switches 200 and 300 respectively input signals SW1 and SW2 and in turn perform data exchange. Therefore, the data in the input data packet PD is written as write data WD in the addressing domain in memory 600 specified by the address AD and also has the corresponding valid flag 105 set. As a result, the input data packet PD queues for input of data to be paired at memory 600.

Control State [3]

When the 2-operand flag 106 in the data packet PD input to paired data detecting unit 12 and the valid flag 105 in the data RD read from memory 600 are set and comparator 100 outputs a ZERO signal 104 of a "1" level, switch control portion 400 outputs signals SW1 and SW2 with an N-EX level set and a signal FS with a "0" level set in response to a detection of firing at comparator 100. In response to the applied signals SW1 and SW2, switches 200 and 300 operate for data non-exchange. The input data packet PD, with matching operand data D3 in the data RD read from memory 600 stored in its data 2 field F6, is output through circuit 50 and applied to packet erasing unit 13. When the determination is made that the data packet PD applied from paired data detecting unit 12 stores generation number data CD having lower priority than that of the generation number data set by an erasing packet EPA which has been input immediately before, packet erasing unit 13 erases the input data packet PD in response to the determination. On the other hand, when the input data packet PD is not erased by packet erasing unit 13, the packet is applied from packet erasing unit 13 to operation processing unit 14. Operation processing unit 14 inputs the applied data packet PD, performs an operation processing with respect to the contents of the first or the second data field of the input data packet PD based on the operation instruction OP stored in the input data packet PD, stores the operation result data in the field F5 of the input data packet PD and applies the input data packet PD to branch unit 15. Branch unit 15 inputs the applied data packet PD and selectively outputs the input data packet PD either outside information processor 2 or to data buffer 16 based on the destination information (node number data "node" or generation number data CD) of the input data packet.

Data buffer 16 applies the input data packet PD to junction unit 10 and junction unit 10 inputs the applied data packet and applies the same to program storing unit 11, so that instruction information to be executed next stored in program storing unit 11 is read together with the corresponding destination information, whereby subsequent operation processing according to the read information is similarly executed.

Control State [4]

When the 2-operand flag 106 in the data packet PD input to paired data detecting unit 12 and the valid flag 105 read from memory 600 by addressing based on an address AD are set and the ZERO signal 104 and the MSB signal 103 are output at a "0" level from comparator 100, switch control portion 400 outputs a signal SW1 with an N-EX level set, a signal SW2 with an EX level set and a control signal FS with a "1" level set in response to a detection of unfiring by comparator 100 and to read data RD, which have been queuing at memory 600, having higher processing priority than that of the input data packet PD. In response to an input of the signal SW1, switch 200 operates for data non-exchange and applies the input data packet PD to latch circuit 50, while switch 300, in response to an input of the signal SW2, operates for data exchange and outputs the read data RD as write data WD to memory 600. Therefore, when the priority of matching data stored in a domain in memory 600 specified by an address AD is higher than that of the input data packet PD, the matching data is given priority for waiting for an input of data to be paired at memory 600. In addition, this input data packet PD distinguished as having lower processing priority has its unfiring flag 107 set at latch circuit 50 in response to a control signal FS, which data packet is output to packet erasing unit 13. Packet erasing unit 13 inputs the data packet PD. When the determination is made that the input data packet PD is to be erased as described above, the data packet PD is erased at packet erasing unit 13, while when the determination is made that the input data packet PD is not to be erased, the input data packet PD is output to operation processing unit 14.

The data packet PD with the unfiring flag 107 set is output to paired data detecting unit 12 and is passed through operation processing unit 14, branch unit 15, data buffer 16, junction unit 10 and program storing unit 11 without being processed and again input to paired data detecting unit 12. Paired data detecting unit 12 inputs the again applied data packet PD. When a matching region in memory 600 specified by an address AD concerning the input data packet PD is empty or when the priority of queuing data stored in the region is lower than that of the input data packet PD, the data in the input data packet PD is written in the matching region wherein the data is allowed to match an input of data to be paired. Conversely, when the matching region is not empty and the priority of the matching data stored in the matching region is higher than that of the input data packet PD, the input data packet PD, with the unfiring flag 107 set, passes through the respective portions in the same manner as described above and again input to paired data detecting unit 12. If the data having the same priority are stored in the matching region, firing is detected of the input data packet PD.

Control State [5]

When the 2-operand flag 106 in the data packet PD input to the paired data detecting unit and the valid flag 105 in the data RD read from memory 600 are set and the ZERO signal 104 and the MSB signal 103 are output at a "0" level and a "1" level, respectively, from comparator 100, comparator 100 detects unfiring, and switch control portion 400 outputs switching signals SW1 and SW2 with an EX level set as well as a control signal FS with a "1" level set in response to the input data packet PD having higher processing priority than the matching data stored in the domain in memory 600 specified by the address AD. Switches 200 and 300 operate for data exchange in response to the signals SW1 and SW2, respectively. As a result, the read data RD from memory 600 is made by latch circuit 50 into a data packet PD with the unfiring flag 107 set based on the signal FS and output to packet erasing portion 13, and the data in the input data packet PD is written as write data WD in the domain in memory 600 specified by the address AD. This implies that the data in the input data packet PD is written in the above-described addressing domain to be given priority for matching for an input of data to be paired. The data packet PD with the read data RD output from paired data detecting unit 12 stored and the unfiring flag 107 set, is applied to packet erasing unit 13. Packet erasing unit 13 inputs the applied data packet PD. When the determination is made that the input data packet PD is to be erased as described above, packet erasing unit 13 erases the input data packet PD, otherwise the unit outputs the input data packet to operation processing unit 14. Since the unfiring flag 107 is set in the data packet PD, operation processing unit 14 and the following respective processing units pass the data packet PD without processing the same, so that the data packet PD is again applied to paired data detecting unit 12. At this time, when no firing is detected by another firing detection and no matching for inputs of data to be paired is made at memory 600, the data packet PD, with the unfiring flag 107 set, again passes through the respective units to return to paired data detecting unit 12.

As is described in the section of the control states [4] and [5], the data packet PD with the unfiring flag 107 set output from paired data detecting unit 12 is to continue circulating through the inside of data driven type information processor without being processed until firing is detected at paired data detecting unit 12 or until matching for an input of data to be paired is allowed in memory 600.

As described in the foregoing, the generation number comparing operation by paired data detecting unit 12 at a time of contention for access to memory 600 is not a mere comparison of numerical values but a comparison in the ring-like relationship as shown in FIG. 1A between generation number data CD stored in an input data packet PD and matching generation number data CD1 in data RD read from memory 600 by addressing based on an address AD concerning the input data packet PD, a result of which comparison is used to determine processing priority, that is, the order in which data packets are allowed to match for inputs of data to be paired at memory 600. It is therefore possible to ensure a data packet PD whose data processing should be made first (the data packet applied to data driven type information processor 2 first) to receive data processing priority (priority for using a matching region). This prevents a delay of processing caused because data to be fired first is not allowed to use a matching region in memory 600, and prevents generation of deadlock.

Reuse of generation numbers will be described in the following. Reuse of generation numbers is applicable, for example, to data processing of video signals for television by data driven type information processor 2. Assuming that data forming image which changes every 1/60 seconds in response to a video signal to be considered as one data packet group and that different generation number data CD are allotted to different images, the video signal is continuously transmitted. Therefore, generation number data CD of data packet groups input to information processor 2 should be sequentially updated in the order of transmission. However, even when not all input data packet groups are collected due to some interference of radio wave and image with certain generation number data allotted is not completed, for updating the image every 1/60 second to have a normal image, a data processing related to the unfinished image should be canceled. An effective reuse of generation numbers is possible if the data packet group whose processing is thus canceled is erased inside information processor 2 and the generation number data allotted to the erased data packet can be re-allotted to subsequently input data packet groups. This is readily implemented by combining paired data detecting unit 12 and packet erasing unit 13 which employs a generation number data comparing method in paired data detecting unit 12 as described above.

Although in the present embodiment, an address AD for accessing memory 600 is calculated by using only node number data "node" in an input data packet PD, the calculation may be made by using generation number data CD and node number data "node".

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processor for processing, in parallel, a plurality of different data packet groups each previously allotted generation number for identification in accordance with a data flow program, comprising:
program storing means for storing said data flow program including a plurality of destination information and a plurality of instruction information, receiving a data packet composed of a generation number field for storing said generation number, a destination field for storing destination information, an instruction field for storing instruction information and first and second data fields for storing data, reading destination information and instruction information from said data flow program by addressing based on the contents of the destination field of the received data packet, storing the read destination information and the read instruction information in the destination field and the instruction field of the received data packet and outputting said received data packet, a matching memory operatively connected to said program storing means, having an address space, physical addresses of which correspond to values obtained by subjecting the contents of said data packet to an operation, and for storing the contents of said data packet in accordance with each physical address, paired data generating means operatively connected to said program storing means, for receiving a data packet output from said program storing means, comparing the contents of the received data packet with the contents of the data packet in said matching memory specified by said physical address obtained from the contents of said received data packet, and based on the comparison result, (i) generating a data pair and storing each generated data pair in the first and the second data fields of said received data packet to output said received data packet, or (ii) writing the contents of said received data packet in the matching memory specified by the physical address, or (iii) outputting said received data packet without operating the same, or (iv) replacing the contents in said received data packet and the contents of the data packet in the matching memory specified by the physical address with each other to output said received data packet, and operation processing means operatively connected to said paired data generating means, for receiving a data packet output from said paired data generating means, decoding instruction information in the instruction field of the received data packet, subjecting data in the first or the second data field of the received data packet to an operation processing based on the decoding result, storing the operation result in the first or the second data field of the received data packet and outputting the received data packet to said program storing means, wherein said generation numbers being successive in a ring-like relationship in which processing priority for generating said paired data is fixed in one circular direction and being numbers previously and sequentially allotted to said plurality of data packet groups in the order of application of the packet groups to said information processor, when, as a result of said comparison at said paired data generating means, a data packet input to said paired data generating means and a data packet stored in said addressed matching memory content for access because they have the same physical address, generation numbers in both data packets contending for access are compared in said ring-like relationship to make sure that the processing priority of both data packets for said paired data generation coincides with the order of application of both data packets to said data driven type information processor according to the comparison result.

2. The data driven type information processor according to claim 1, wherein said data packet further has a control field for storing through/non-through information and ½ operand information indicating whether instruction information in the instruction field of the data packet require one or two operands, said program storing means outputs the received data packet without operating the same when the through/non-through information in said control field of the received data packet indicates "through", said paired data generating means outputs the received data packet without operating the same when the ½ operand information in said control field of the received data packet indicates "1", and said operating means outputs the received data packet without operating the same when the through/non-through information in said control field of the received data packet indicates "through".

3. The data driven type information processor according to claim 2, wherein said matching memory further stores at respective physical addresses matching information indicating that the contents of the respective physical addresses are empty/non-empty, and said paired data generating means further includes:

reading means for receiving said data packet and reading the contents of the data packet from said matching memory by said addressing based on a value obtained by subjecting the generation number in the generation number field or destination information in the destination field of the received data packet to said predetermined operation, comparing means for comparing the generation number in the generation number field of the received data packet with the generation number in the contents of the data packet read by said reading means, and controlling means for (i) storing data in the contents of the data packet read by said reading means in one of the first and the second data fields of the received data packet to output the received data packet with a data pair stored therein and rewrite said matching information corresponding to the contents of the read data packet in said matching memory so as to indicate "empty", or (ii) outputting the received data packet without operating the same, or (iii) outputting the received data packet by replacing the contents of the received data packet and the contents of the data packet in the addressed matching memory with each other, based on the comparison result of said comparing means when said matching information corresponding to the contents of the data packet read by said reading means indicate "non-empty", and replacing the contents of the data packet in said addressed matching memory by the contents of the received data packet and rewriting the corresponding matching information to indicate "non-empty" when said matching information corresponding to the contents of the data packet read by said reading means indicate "empty".

4. The data driven tape information processor according to claim 3, wherein said comparing means compares the generation number in the contents of the data packet read by said reading means with the generation number in the generation number field of said received data packet in said ring-like relationship to output a match signal indicative of match of both of the generation numbers or a mismatch signal indicative of mismatch of both of the generation numbers, and said controlling means (i) outputs a data packet which stores said data pair in response to said comparing means outputting the match signal, and (ii) outputs said received data packet without operating the same, or replaces the contents in said received data packet and the contents of the data packet in the addressed matching memory with each other to output the received data packet in response to said comparing means outputting the mismatch signal.

5. The data driven type information processor according to claim 4, wherein said mismatch signal further includes a signal indicative of priority for said paired data generating processing between a data packet input to said paired data detecting means and a data packet read from said matching memory by said reading means, and said controlling means outputs the input data packet without operating the same in response to said priority signal indicating that said read data packet has higher priority than said input data packet, and replaces the contents in the input data packet and the contents in the data packet in said addressed matching memory with each other to output said input data packet in response to said priority signal indicating that said input data packet has higher priority than said read packet.

6. The data driven type information processor according to claim 5, further including packet erasing means operatively connected to the paired data generating means, for erasing packet groups processing of which are not required out of the plurality of data packet groups processed in parallel in accordance with said data flow program.

7. The data driven type information processor according to claim 6, wherein said packet erasing means includes:

supplying means for generating a packet for erase including said control field wherein said through/-non-through information indicative of "through" and said ½ operand information indicative of "1" are stored, said generation number field wherein generation number allotted to said data packet groups processings of which are not required is stored and said instruction field wherein said instruction for erase is stored and supplying the packet for erase to said data driven type information processor, generation number comparing means for receiving said packet for erase supplied from said supplying means and comparing a generation number in the generation number field of the received packet for erase and a generation number in the generation number field of the data packet being processed in accordance with said data flow program, and means for erasing said data packet being processed based on the comparison result of said generation number comparing means in response to said erase instruction in the instruction field of said received packet for erase.

8. The data driven type information processor according to claim 7, wherein said supplying means, when the generation number allotted to said data packet group a processing of which is not required is re-allotted to a new data packet group and the new data packet group is supplied to said data driven type information processor, supplies said packet for erase to said data driven type information processor prior to the supply of the new packet group.

9. The data driven type information processor according to claim 3, further including packet erasing means operatively connected to the paired data generating means, for erasing packet groups processing of which are not required out of the plurality of data packet groups processed in parallel in accordance with said data flow program.

10. The data driven type information processor according to claim 9, wherein said packet erasing means includes:

supplying means for generating a packet for erase including said control field wherein said through/-non-through information indicative of "through" and said ½ operand information indicative of "1" are stored, said generation number field wherein generation number allotted to said data packet groups processings of which are not required is stored and said instruction field wherein said instruction for erase is stored and supplying the packet for erase to said data driven type information processor, and generation number comparing means for receiving said packet for erase supplied from said supplying means and comparing a generation number in the generation number field of the received packet for erase with a generation number in the generation number field of the data packet being processed in accordance with said data flow program, and means for erasing said data packet being processed based on the comparison result of said generation number comparing means in response to said erase instruction in the instruction field of the received packet for erase.

11. The data driven type information processor according to claim 10, wherein said supplying means, when the generation numbers allotted to said data packet group a processing of which is not required is re-allotted to a new data packet group and the new data packet group is supplied to said data driven type information processor, supplies said packet for erase to said data driven type information processor prior to the supply of the new packet group.

12. The data driven type information processor according to claim 4, further including packet erasing means operatively connected to the paired data generating means, for erasing packet groups processing of which are not required out of the plurality of data packet groups processed in parallel in accordance with said data flow program.

13. The data driven type information processor according to claim 12, wherein said packet erasing means includes:

supplying means for generating a packet for erase including said control field wherein said through/-non-through information indicative of "through" and said ½ operand information indicative of "1" are stored, said generation number field wherein generation number allotted to said data packet groups processings of which are not required is stored and said instruction field wherein said instruction for erase is stored and supplying the packet for erase to said data driven type information processor, generation number comparing means for receiving said packet for erase supplied from said supplying means and comparing a generation number in the generation number field of the received packet for erase with a generation number in the generation number field of the data packet being processed in accordance with said data flow program, and means for erasing said data packet being processed based on the comparison result of said generation number comparing means in response to said erase instruction in the instruction field of the received packet for erase.

14. The data driven type information processor according to claim 13, wherein said supplying means, when the generation number allotted to said data packet group a processing of which is not required is re-allotted to a new data packet group and the new data packet group is supplied to said data driven type information processor, supplies said packet for erase to said data driven type information processor prior to the supply of the new packet group.

15. The data driven type information processor according to claim 2, further including packet erasing means operatively connected to the paired data generating means for erasing packet groups processings of which are not required out of the plurality of data packet groups processed in parallel in accordance with said data flow program.

16. The data driven type information processor according to claim 15, wherein said packet erasing means includes:

supplying means for generating a packet for erase including said control field wherein said through/non-through information indicative of "through" and said ½ operand information indicative of "1" are stored, said generation number field wherein generation number allotted to said data packet groups processings of which are not required is stored and said instruction field wherein said instruction for erase is stored and supplying the packet for erase to said data driven type information processor, generation number comparing means for receiving said packet for erase supplied from said supplying means and comparing a generation number in the generation number field of the received packet for erase with a generation number in the generation number field of the data packet being processed in accordance with said data flow program, and means for erasing said data packet being processed based on the comparison result of said generation number comparing means in response to said erase instruction in the instruction field of the received packet for erase.

17. The data driven type information processor according to claim 16, wherein said supplying means, when generation number allotted to said data packet group a processing of which is not required is re-allotted to a new data packet group and the new data packet group is supplied to said data driven type information processor, supplies said packet for erase to said data driven type information processor prior to the supply of the new data packet group.

18. The data driven type information processor according to claim 1, wherein said matching memory further stores at respective physical addresses matching information indicating that the contents of the respective physical addresses are empty/non-empty, and said paired data generating means further includes:

reading means for receiving said data packet and reading the contents of the data packet from said matching memory by said addressing based on a value obtained by subjecting the generation number in the generation number field or the destination information in the destination field of the received data packet to said predetermined operation, comparing means for comparing the generation number in the generation number field of the received data packet with the generation number in the contents of the data packet read by said reading means, and controlling means for (i) storing the data in the contents of the data packet read by said reading means in one of the first and the second data fields of the received data packet to output the received data packet with the data pair stored therein and rewrite said matching information corresponding to the contents of the read data packet in said matching memory so as to indicate "empty", or (ii) outputting the received data packet without operating the same, or (iii) outputting the received data packet by replacing the contents in the received data packet and the contents of the data packet in the addressed matching memory with each other, based on the comparison result of said comparing means when said matching information corresponding to the contents of the data packet read by said reading means indicate "non-empty", and replacing the contents of the data packet in said addressed matching memory by the contents of the received data packet and rewriting the corresponding matching information to indicate "non-empty" when said matching information corresponding to the contents of the data packet read by said reading means indicate "empty".

19. The data driven type information processor according to claim 18, wherein said comparing means compares a generation number in the contents of a data packet read by said reading means with a generation number in a generation number field of the received data packet in said ring-like relationship to output a match signal indicative of match of both of the generation numbers or a mismatch signal indicative of mismatch of both of the generation numbers, and said controlling means (i) outputs a data packet which stores said data pair in response to said comparing means outputting the match signal, and (ii) outputs said received data packet without operating the same or replaces contents in said received data packet and the contents of the data packet in the addressed matching memory with each other to output said received data packet in response to said comparing means outputting the mismatch signal.

20. The data driven type information processor according to claim 19, wherein said mismatch signal further includes a signal indicative of priority for said paired data generating processing between a data packet input to said paired data detecting means and a data packet read from said matching memory by said reading means, and said controlling means outputs the input data packet without operating the same in response to said priority signal indicating that said read data packet has higher priority than said input data packet, and replaces the contents in the input data packet and the contents in the data packet in said addressed matching memory with each other to output said input data packet in response to said priority signal indicating that said input data packet has higher priority than said read packet.

21. The data driven type information processor according to claim 20, further including packet erasing means operatively connected to the paired data generating means, for erasing packet groups processing of which are not required out of the plurality of data packet groups processed in parallel in accordance with said data flow program.

22. The data driven type information processor according to claim 18, further including packet erasing means operatively connected to the paired data generating means, for erasing packet groups processing of which are not required out of the plurality of data packet groups processed in parallel in accordance with said data flow program.

23. The data driven information processor according to claim 19, further including packet erasing means operatively connected to the paired data generating means, for erasing packet groups processing of which are not required out of the plurality of data packet groups processed in parallel in accordance with said data flow program.

24. The data driven type information processor according to claim 1, further including packet erasing means operatively connected to the paired data generating means, for erasing packet groups processings of which are not required out of the plurality of data packet groups processed in parallel in accordance with said data flow program.

25. The data driven type information processor according to claim 1, wherein the operation is an index transformation operation.

26. The data driven type information processor according to claim 25, wherein the index transformation operation is hashing.

* * * * *